United States Patent [19]

Prieto

[11] Patent Number: 5,427,171
[45] Date of Patent: Jun. 27, 1995

[54] METHOD AND APPARATUS FOR CASTING VEHICLE WHEELS HAVING LIGHTENER POCKETS

[75] Inventor: Romulo A. Prieto, Northville, Mich.

[73] Assignee: Hayes Wheels International, Inc., Romulus, Mich.

[21] Appl. No.: 236,733

[22] Filed: May 2, 1994

Related U.S. Application Data

[63] Continuation of Ser. No. 160,027, Nov. 30, 1993.

[51] Int. Cl.⁶ .................. B22C 9/28; B22D 29/00; B22D 33/04
[52] U.S. Cl. .................... 164/132; 164/137; 164/340; 164/342; 164/345; 249/56
[58] Field of Search ........... 164/340, 342, 345, 137, 164/132; 249/56

[56] References Cited

U.S. PATENT DOCUMENTS

| 4,301,856 | 11/1981 | DiRosa | 164/340 |
| 4,420,190 | 12/1983 | Rohr . | |
| 4,436,133 | 3/1984 | Rohr . | |
| 4,861,113 | 8/1989 | Imamura et al. . | |
| 4,958,676 | 9/1990 | Kuntz | 164/345 X |
| 5,311,918 | 5/1994 | Scott . | |

FOREIGN PATENT DOCUMENTS

| 600798 | 6/1960 | Canada | 164/342 |
| 627914 | 10/1978 | U.S.S.R. | 164/345 |
| 707686 | 1/1980 | U.S.S.R. | 164/345 |
| 900959 | 1/1982 | U.S.S.R. | 164/340 |

Primary Examiner—J. Reed Batten, Jr.
Attorney, Agent, or Firm—MacMillan, Sobanski & Todd

[57] ABSTRACT

The apparatus includes a wheel mold that has a top segment having a plurality of openings formed therethrough. Movable cores are carried in the top segment openings. A mechanism is mounted on the top segment to alternately extend the cores into the mold cavity and retract the cores into the openings. To form a wheel, the movable cores are extended and molten metal is introduced into the mold cavity. The movable cores form recesses in the resulting wheel casting. After casting has cooled sufficiently, the movable cores are retracted from the recesses allowing the top segment to be withdrawn from the wheel casting. The casting is then removed from the mold.

13 Claims, 10 Drawing Sheets

METHOD AND APPARATUS FOR CASTING VEHICLE WHEELS HAVING LIGHTENER POCKETS

CROSS REFERENCE TO RELATED APPLICATION

This application is a continuation of copending U.S. patent application Ser. No. 08/160,027, filed Nov. 30, 1993.

BACKGROUND OF THE INVENTION

This invention relates in general to cast vehicle wheels and in particular to a method and an apparatus for forming lightener pockets in such wheels.

Figure 1:
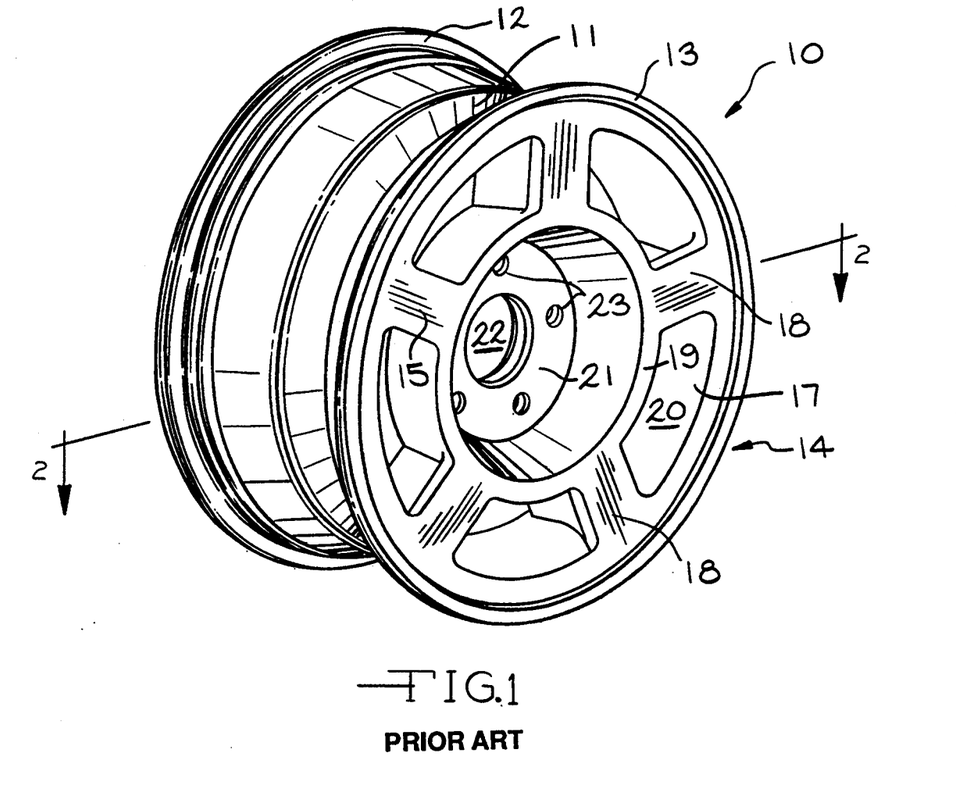
FIG. 1 is a perspective view of a cast vehicle wheel in accordance with the prior art.

Cast wheels formed from light weight metals and metal alloys are replacing steel wheels on an increasing number of vehicles. Such cast wheels provide both a reduction in weight from steel wheels and an attractive appearance. Referring now to the drawings, there is illustrated in FIG. 1 a perspective view of a typical cast vehicle wheel, indicated generally at 10, which is formed in accordance with the prior art. The prior art wheel 10 includes an annular wheel rim 11 which is adapted to carry a vehicle tire (not shown). The wheel rim 11 has an axial inner end 12 which is adjacent to the vehicle (not shown) when the wheel 10 is mounted thereon and an axial outer end 13 opposite from the inner end 12.

The wheel 10 further includes a circular wheel disk 14 formed across the outer end 13 of the wheel rim 11. The wheel disk 14 has an outer surface 15 which is visible when the wheel 10 is mounted upon the vehicle. Accordingly, the outer disk surface 15 is typically machined to a smooth finish and/or decorated. As shown in the sectional view of FIG. 2, the junction of the wheel disk 14 and the rim 11 forms a sidewall 17 which is thicker than either the wheel disk 14 or the rim 11. The wheel disk 14 includes a plurality of radial spokes 18 connecting the sidewall 17 to a central wheel hub 19. The spokes 18 define a plurality of openings 20 formed through the wheel disk 14. The openings 20 allow a flow of cooling air to the vehicle brakes while reducing the weight of the wheel 10.

Figure 2:
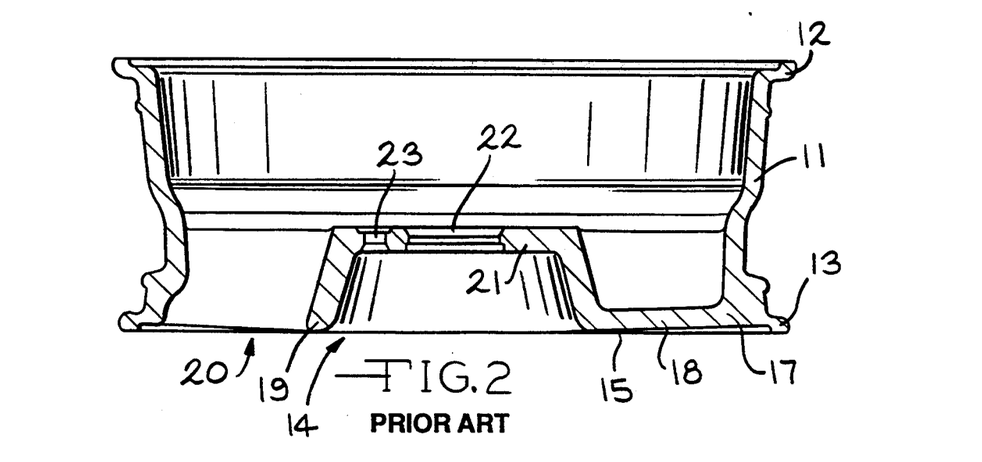
FIG. 2 is a sectional view of the prior art wheel taken along line 2—2 in FIG. 1.

The hub 19 includes a recessed center portion 21 having a large central aperture 22 formed therethrough which can receive the end of a vehicle axle (not shown). The recessed center portion 21 also includes a plurality of smaller apertures 23 formed therethrough and spaced equally about the central aperture 22. These smaller apertures 23 receive threaded wheel lugs (not shown) for securing the wheel 10 upon a vehicle.

Figure 3:
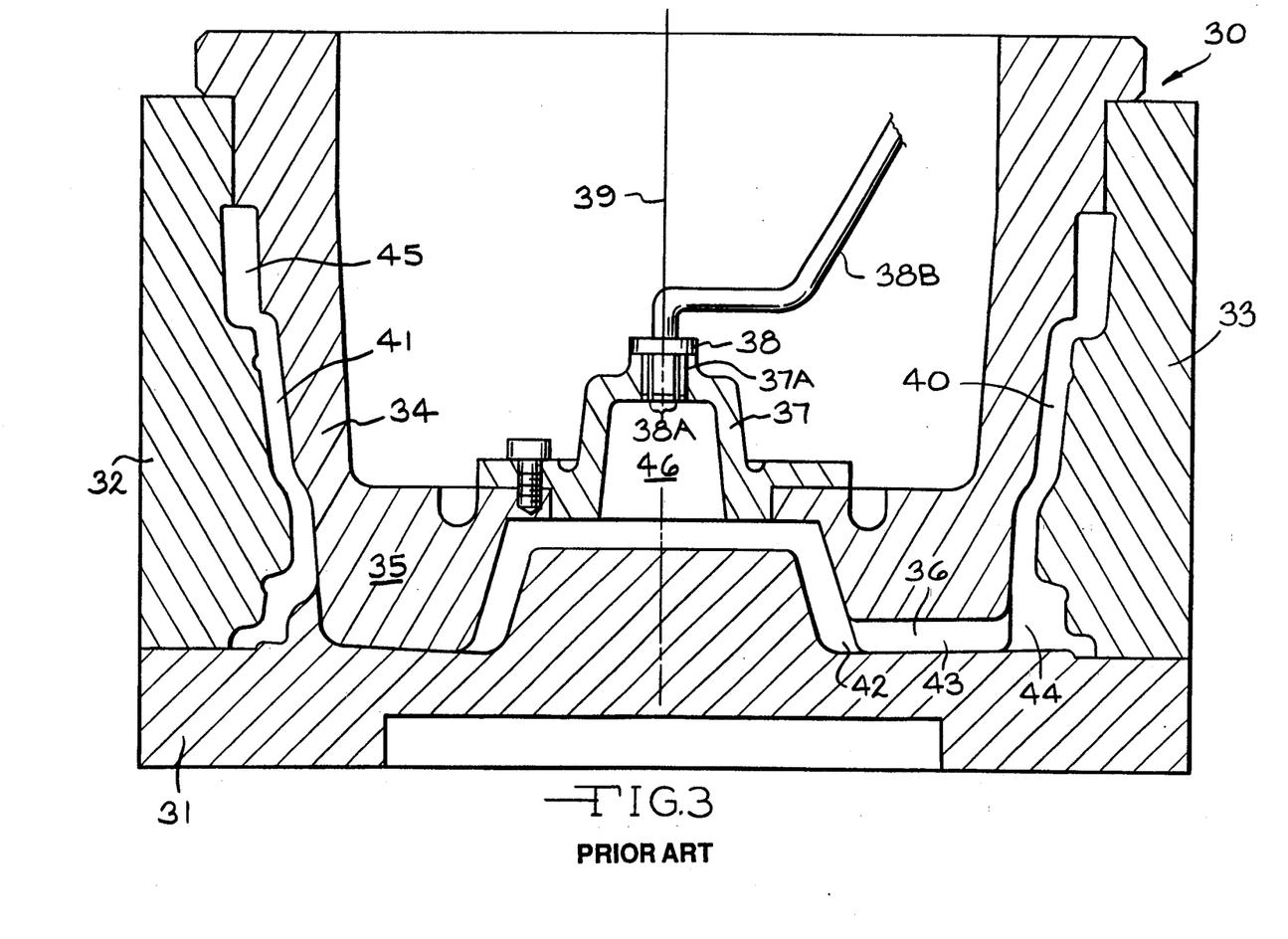
FIG. 3 is a sectional view of a wheel mold used to cast the prior art wheel shown in FIG. 1.

The wheel 10 is typically formed by gravity feeding or pressure injecting a molten metal, such as aluminum, magnesium or titanium, into a multi-piece wheel mold. A sectional view of a typical prior art multi-piece mold 30 for casting the wheel 10 is shown in FIG. 3. The individual pieces of the mold 30 are usually formed from cast iron or high carbon steel.

The mold 30 includes a bottom segment 31 which supports the other mold pieces. Two or more movable side segments 32 and 33 are carried by the bottom segment 31. The side segments 32 and 33 are moved in a radial direction between extended and retracted positions by a mechanism (not shown) that is conventional in the art. The side segments 32 and 33 are shown in the extended position in FIG. 3, with the side segments 32 and 33 together. When moved to the retracted position (not shown), the side segments 32 and 33 are separated and moved apart from each other.

A movable cup-shaped top segment 34 having a annular-shaped base 35 is disposed within the mold side segments 32 and 33 with the base 35 contacting the top surface of the bottom segment 31, as shown to the left of FIG. 3. The bottom surface of the top segment base 35 includes a plurality of radial grooves 36 formed thereacross in extended portions 36, one of which is shown to the right of FIG. 3. The radial grooves 36 are spaced equally apart about the base 35. A hub riser segment 37 is secured to the top of the top segment base 35. A central vent 37A is formed through the top of the hub riser segment 37 to allow gases to escape from the mold 30 during casting operations. A segment plug 38 having a plurality of slots 38A for venting gases is disposed in the central vent 37A. A handle 38 B is attached to the top of the segment plug 38. A mechanism (not shown), that is conventional in the art, raises and lowers the top segment 34 and hub riser segment 37 along a central axis 39.

The mold segments 31, 32, 33, 34, 36 and 37, upon assembly, define a mold cavity 40 wherein the wheel 10 is cast. The mold cavity 40 includes an annular rim cavity 41 for casting the wheel rim 11 and a disk cavity 42 for casting the wheel disk 14. The disk cavity 42 includes radial spoke cavities 43 defined by the radial grooves 36 in the top segment base 35. An annular sidewall cavity 44 for casting the wheel sidewall 17 joins the rim cavity 41 to the disk cavity 42. An annular rim riser cavity 45 is formed adjacent to the rim cavity 41. Similarly, a cylindrical hub riser cavity 46 is defined by the hub riser segment 37 adjacent to the inner center of the disk cavity 42.

To cast a wheel 10, molten metal is fed by a conventional method, such as gravity or under pressure, into the mold cavity 40 through a sprue (not shown). The molten metal flows into the disk, spoke, sidewall and rim cavities 42, 43, 44 and 41, and then fills the rim and hub riser cavities 45 and 46. As the metal contained in the mold cavity 40 cools and contracts molten metal flows from the riser cavities 45 and 46 back into the mold cavity 40 to fill any voids formed by the contraction.

Once the metal has cooled sufficiently, the top segment 34 is raised and the side segments 32 and 33 moved to their retracted position to allow removal of the wheel casting from the mold 30. Additionally, when needed, an operator grasps the handle 38A and manually removes the segment plug 38 to clean any excess casting metal from the segment plug slots 38A.

Following removal from the mold 30, the wheel casting is subjected to conventional machining operations to form the finished wheel 10.

As described above, the sidewall 17 of the cast wheel 10 is typically thickest at its junctions with the ends of the wheel spokes 18, adding weight to the wheel 10. The corresponding thickness of the sidewall mold cavity 43 holds a large volume of molten metal which can take longer to cool than the molten metal contained in the rim and wheel disk cavities 41 and 42. When this happens, the wheel rim 11 and disk 14 can solidify before the sidewall 17. Molten metal in the rim and hub riser cavities 44 and 45 is then prevented from flowing into the sidewall cavity 43 as the metal therein contracts. As a result, voids can be formed in the sidewall 17, reducing the strength of the wheel 10 and potentially marring the wheel's appearance.

It is known in the art to form recesses, or lightener pockets, in the outer surface of the sidewall 17 adjacent to the ends of the wheel spokes 18. Such a cast wheel is described in U.S. Pat. No. 4,861,113 to Imamura, et al. The lightener pockets reduce the thickness of the wheel sidewall 17 causing the molten metal in the sidewall cavity 43 to cool more rapidly than in the rim and disk cavities 41 and 42. As a result, molten metal in the hub and rim riser cavities 44 and 45 can flow into the sidewall cavity 43 as the metal therein contracts. This substantially reduces the possibility of voids being formed in the wheel sidewall 17 as the metal solidifies. Additionally, the lightener pockets reduce the weight of the wheel.

It is known in the art to use loose core pieces to form recesses in cast parts. The loose pieces are removed from the recesses after the casting is removed from the mold. When light weight metals, such as aluminum, are used to cast such parts, the metal surrounding the loose core pieces shrinks as it cools, making it difficult to remove the loose pieces from the recesses. Thus, a separate machine is usually required to pull the loose pieces from the recesses. As an alternative, it is also known to machine the recesses into the casting. However, machining is time consuming and expensive.

SUMMARY OF THE INVENTION

This invention relates to a method and apparatus for forming lightener pockets in cast metal wheels.

The apparatus includes a wheel mold having a bottom segment supporting two or more retractable side segments and a top segment disposed between the side segments. The top segment includes a plurality of openings formed therethrough which are adjacent to the sidewall portion of the mold cavity. A center vent formed through the top segment allows gases to escape during casting operations. The top segment can be raised and lowered along a mold axis which is perpendicular to the bottom segment.

The apparatus also includes a spacer and guide plate which is secured to the inside of the top segment. The spacer and guide plate has a plurality of guide slots formed therein which are aligned with the top segment openings. A slidable pocket core is carried by each guide slot and is movable within the slot between extended and retracted positions. When in the extended position, the pocket cores extend through the top segment openings and into the sidewall portion of the mold cavity to form lightener pockets in the casting. When in the retracted position, the pocket cores are fully withdrawn into the top segment openings.

The apparatus further includes an anchor plate secured to the spacer and guide plate. The anchor plate supports a means for moving the pocket cores which includes a plurality of pivotable yoke members. Each yoke member includes a pair of projecting arms. One arm of each yoke member engages a slot formed in one of the pocket cores.

The other arm of each yoke member is operatively connected to an actuator plate which can be raised and lowered along the mold axis independently of the top segment. As the actuator plate is lowered, the yoke members are pivoted in one direction, sliding the pocket cores into their extended positions. Similarly, as the actuator plate is raised, the yoke members are pivoted in a direction opposite to the first direction, sliding the pocket cores into their retracted position. Additionally, a vent tube is mounted upon the actuator plate and extends axially into the center vent. The vent tube includes a plurality of axial vent slots for venting gases from the mold cavity.

The method for forming lightener pockets in a cast vehicle wheel includes assembling the above described wheel mold with the actuator plate lowered to extend the pocket cores fully into the mold cavity and insert the vent plug into the center vent. The mold cavity is then filled with a molten metal to form a wheel casting.

After the mold and wheel casting have cooled, the actuator plate is raised while the top segment remains stationary. The movement of the actuator plate causes the yoke members to pivot, retracting the pocket cores into the top segment openings. Additionally, the vent tube is withdrawn from the center vent, cleaning any excess casting metal from the vent slots. After the pocket cores are fully retracted, the top segment is raised clear of the casting and the side segments retracted. The wheel casting can then removed from the bottom segment.

Following removal of the wheel casting, the side segments are moved together and the top segment lowered into the mold. The actuator plate is then lowered, causing the yoke members to pivot back to their original position and extend the pocket cores through the top segment openings and into the mold cavity. The mold is then ready for casting another wheel.

As described above, the cast wheel produced by the method and apparatus of this invention is lighter and less likely to have voids than similar prior art wheels.

Other advantages of this invention will become apparent to those skilled in the art from the following detailed description of the preferred embodiment, when read in light of the accompanying drawings.

DETAILED DESCRIPTION OF THE PREFERRED EMBODIMENT

Figure 4:
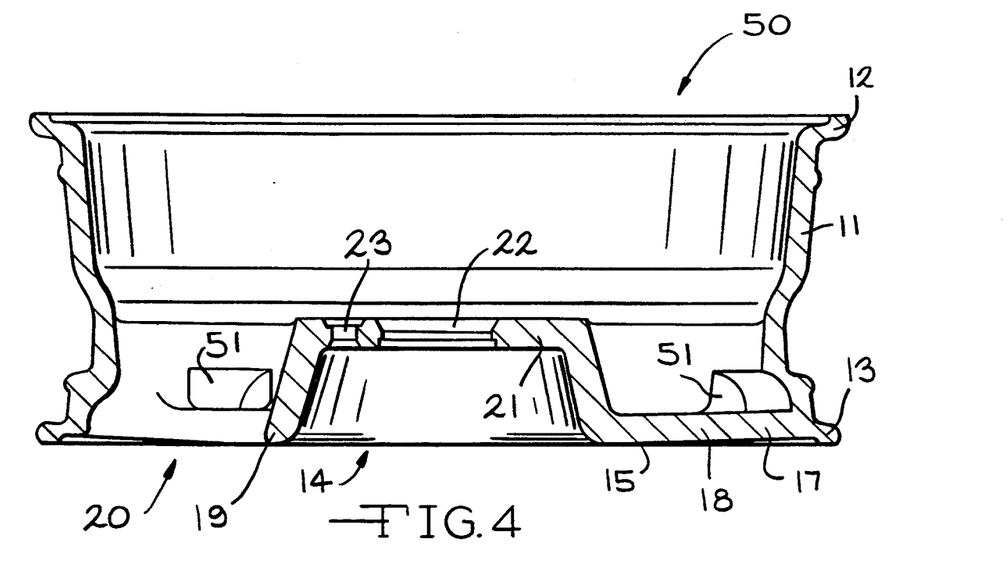
FIG. 4 is a sectional view of a cast wheel which includes lightener pockets.

Referring again to the drawings, there is shown in FIG. 4 a cross sectional view of an improved wheel 50 having lightener pockets 51 formed in the inner surface of the sidewall 17 at the outer radial ends of the wheel spokes 18. As shown in FIG. 4, the pockets 51 are narrower than the spokes 18. The pockets 51 reduce the thickness of the sidewall 17 where the spokes 18 join the wheel rim 11. This reduces the weight of the improved wheel 50 and decreases the amount of time needed for molten metal to solidify when the wheel 50 is cast.

Other portions of the improved wheel 50 which are similar to portions of the prior art wheel 10 are indicated with identical numerical designators. It will be appreciated that, while the drawings and description herein show a cast "one piece" wheel 50, the invention can be practiced to form only a cast component of a multi-piece wheel such as, for example, the full front face of a wheel which is subsequently secured to a formed partial wheel rim. Thus, as used in this description and the following claims, the term "wheel" includes not only a one piece cast wheel, but also a cast component of a multi-piece wheel.

Figure 5:
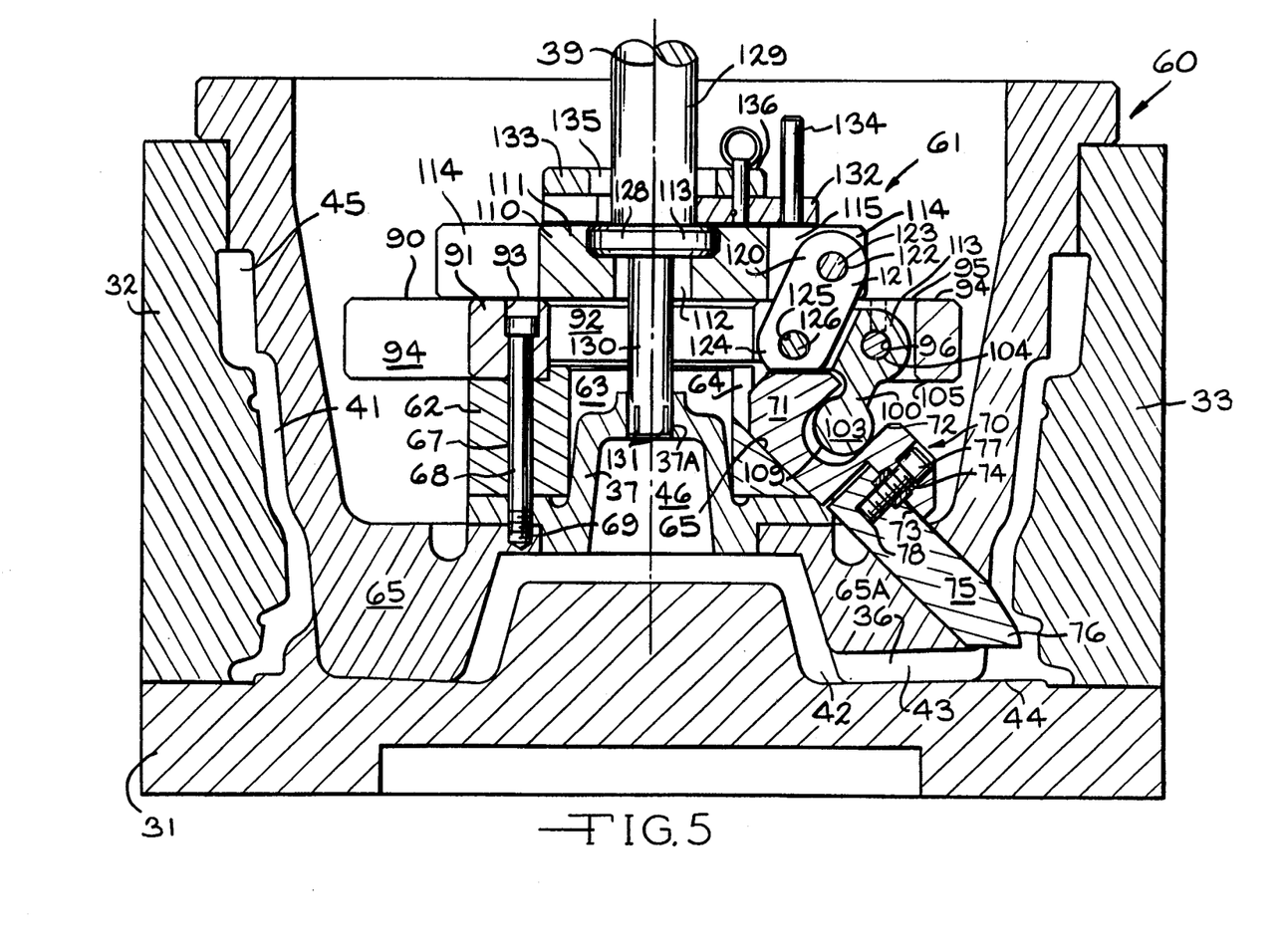
FIG. 5 is a sectional view of a wheel mold which includes an apparatus in accordance with this invention for forming the lightener pockets shown in FIG. 4.

Referring to FIG. 5, there is shown a sectional view of an improved wheel mold 60 in accordance with this invention. The improved wheel mold 60 includes an apparatus 61 for forming the lightener pockets 51 in the improved wheel 50. Components of the improved mold 60 which are similar to components of the prior art mold 30 illustrated in FIG. 3 are identified with the same numerical designators. Similarly, the mold cavities formed by the improved mold 60 also are identified with the same numerical designators used with the prior art mold 30.

The apparatus 61 includes a cylindrical spacer and guide plate 62 having an axial bore 63 formed thru the center thereof. The bore 63 receives the top of the hub riser segment 37. The spacer and guide plate 62 includes a plurality of guide slots 64 formed therein extending radially across the spacer and guide plate 62, one of which is shown in FIG. 5. The guide slots 64 are equally spaced about the circumference of the spacer and guide plate 62 with one guide slot 64 corresponding to each spoke 18 of the improved wheel 50. Furthermore, the spacer and guide plate 62 is oriented within a top segment 65 such that the guide slots 64 are radially aligned with the wheel spoke cavities 43. The guide slots 64 extend from the bore 63 at a downward angle from the axis 39, defining an inclined surface 66 in each slot 64. In the preferred embodiment, the angle between the inclined surface 66 and the central axis 39 is approximately 45 degrees. An opening 65A is formed through the top segment 65 adjacent to the outer radial end of each of the guide slots 64. The openings 65A are radially aligned with the guide slots 64 and slant downward in FIG. 5 at the same angle with the central axis 39 as the guide slot inclined surfaces 66.

An axial bolt hole 67, one of which is shown to the left of FIG. 5, is formed through the spacer and guide plate 62 between each pair of guide slots 64. Bolts 68 pass through the bolt holes 67 and are received by threaded cylindrical recesses 69 formed in the base of the top segment 65 to secure the spacer and guide plate 62 thereto.

Each of the guide slots 64 carries one of a plurality of sliding core assemblies 70. In the preferred embodiment of the apparatus 61, the sliding core assemblies 70 include a generally block shaped core carrier 71. The core carriers 71 include a roll pin cavity 72 formed across the top surface thereof. The roll pin cavity 72 is transverse to the central axis 39 and has a generally rounded sectional shape. The function of the roll pin cavity 72 will be described below. A rectangular core notch 73 is formed in the bottom of the outer radial end of each core carrier 71. An aperture 74 extends through each carrier 71 from the top surface thereof to the core notch 73.

A plurality of pocket cores 75 formed from a material that is not affected by high temperatures are disposed in the core carrier notches 73. The particular core material is selected for the specific application and can include various alloys of steel, titanium and ceramics. The pocket cores 75 extend radially outward from the core notches 73 and end in tapered core tips 76. The pocket cores 75 are retained in the core carrier notches 73 by threaded fasteners 77 which pass through the carrier apertures 74 and are received by a threaded bore 78 formed through each core 75. This allows replacement of the cores 75 if they become worn or damaged. It is also possible to use pocket cores having differently shaped core tips (not shown). This provides a capability to form differently shaped pocket recesses in the wheel without a major reconfiguration of the apparatus 60. It will be appreciated that, while the core assemblies 70 are illustrated as being composed of two separate pieces, a single piece sliding pocket core (not shown) can be used. The pocket core tips 76 extend through the top segment openings 65A and into the sidewall cavity 44, as best seen to the right of FIG. 5. Each opening 65A has the same cross-sectional shape as the pocket core 75.

Figure 8:
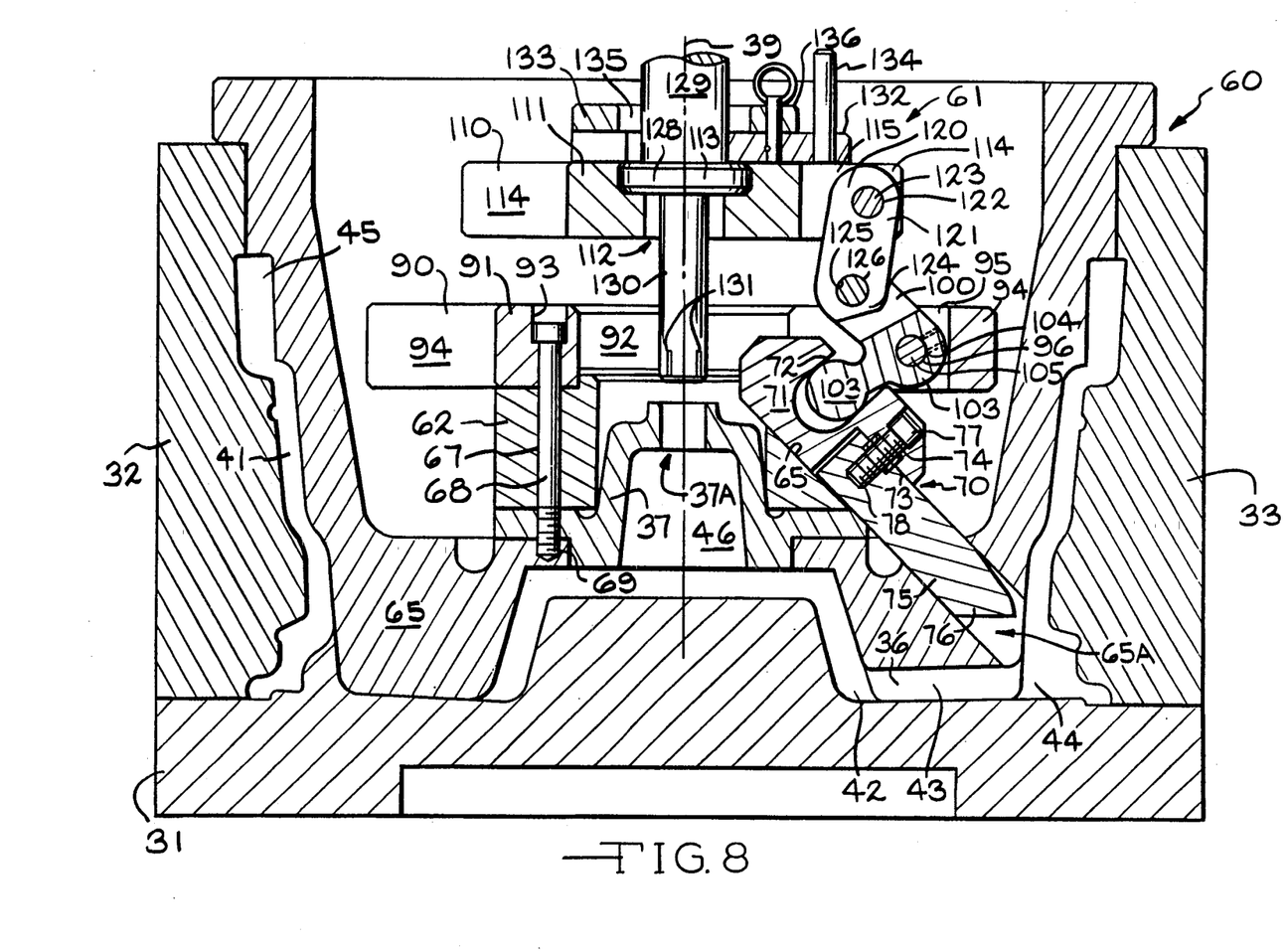
FIG. 8 is a sectional view of the wheel mold shown in FIG. 5 with the apparatus withdrawn.

Because the guide slots 64 are aligned with the top segment openings 65A, each of the core assemblies 70 can be slid within the corresponding guide slot 64 and opening 65A between extended and retracted positions. The extended position is illustrated in FIG. 5 while the retracted position is illustrated in FIGS. 6 and 8.

When the core assemblies 70 are in the extended position, the alignment of the guide slots 64 with the wheel spoke cavities 43 results in the pocket core tips 76 extending into the sidewall cavity 44 at the outer radial end of the spoke cavities 43. As will be explained below, the extended core tips 76 function to form the lightener cavities 51 in the improved cast wheel 50. When the core assemblies 70 are in the retracted position, the core tips 76 are completely withdrawn within the open 65A, as shown in FIG. 8.

Figure 6:
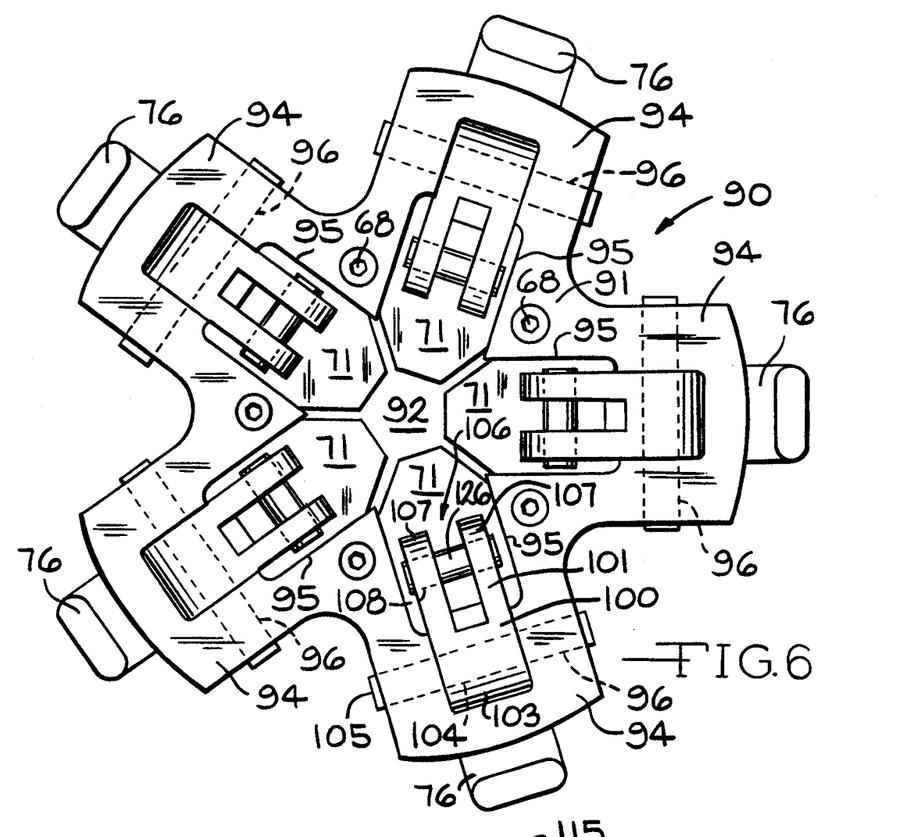
FIG. 6 is a plan view of an anchor plate included in the apparatus shown in FIG. 5.

The apparatus 61 also includes an anchor plate 90, of which a top plan view is shown in FIG. 6. The anchor plate 90 is carried by the spacer and guide plate 62 and is concentric with the central axis 39. The anchor plate 90 includes a cylindrical hub 91 having an axial aperture 92 formed thru the center thereof. A plurality of axial bolt holes 93 that are aligned with the space and guide plate bolt holes 66 are formed through the hub 91. The bolts 68 pass through these anchor plate bolt holes 93 to secure both the spacer and guide plate 62 and the anchor plate 90 to the top segment 65.

The anchor plate 90 further includes a plurality of arms 94 extending radially outward from the hub 91. There is one arm 94 corresponding to each guide slot 64 in the spacer and guide plate 62 and the anchor plate 90 is oriented such that the arms 94 are radially aligned with the guide slots 64. An axial slot 95 extending radially outward from the aperture 92 is formed in each arm 94. A bore 96, shown in phantom in FIG. 6, is formed through both sides of each slot 95 in a direction which is transverse to the axis 39.

A yoke member 100 is disposed in each anchor arm slot 95. Each yoke member 100 is generally V-shaped with upper and lower portions 101 and 102, respectively, extending from a central portion 103. A pivot bore 104, shown in phantom in FIG. 6, is formed through the central portion 103 transverse to the central axis 39. A pivot pin 105 is received by the pivot bore 104 and the anchor plate arm bore 96 to secure each yoke member 100 within the corresponding anchor arm slot 95. The pivot bore 104 is sized to allow rotation of the yoke member 100 about the pivot pin 105.

The yoke member upper portion 101 has a slot 106 formed therein which divides the upper portion 101 into a pair of arms 107, which are best seen in FIG. 6. A connecting bore 108, shown in phantom in FIG. 6, which is transverse to the central axis 39 extends through both arms 107.

The yoke member lower portion 103 has a generally rounded end which forms a roll pin 109. The roll pin 109 of each yoke member 100 extends into the roll pin cavity 72 formed in the core carrier 71 and engages the surface thereof. The roll pin 109 is free to rotate within the roll pin cavity 72.

Figure 7:
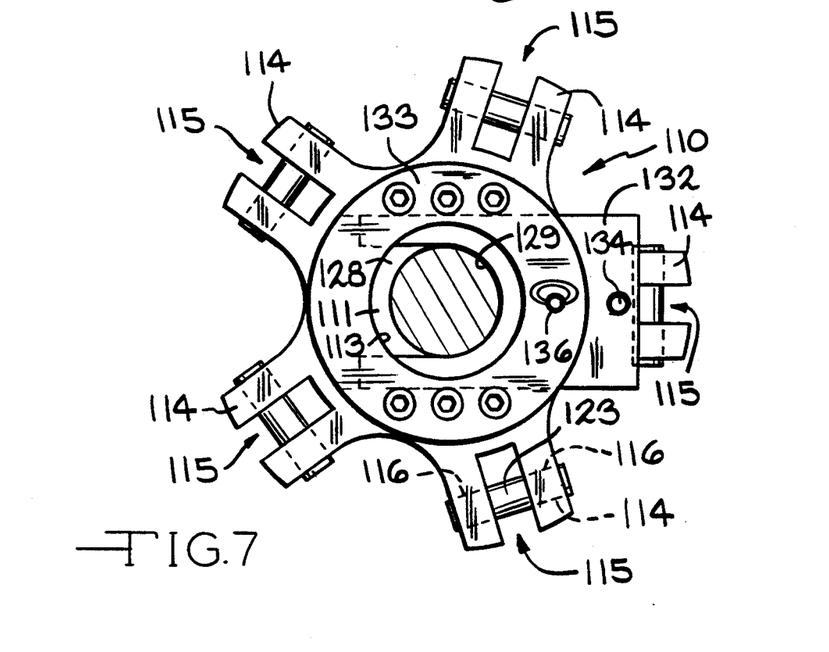
FIG. 7 is a plan view of an actuator plate included in the apparatus shown in FIG. 5.

The apparatus 61 further includes an actuator plate 110, which is shown in FIG. 5 immediately above the anchor plate 90 and concentric with the central axis 39. A top plan view of the actuator plate 110 is shown in FIG. 7. The actuator plate 110 has a shape that is similar to the anchor plate 90 with a central hub 111 having an axial bore 112 formed therethrough. The upper portion of the bore 112 includes a counterbore 113, the function of which will be explained below. A plurality of arms 114 extend radially outward from the central hub 111. The actuator plate 110 has the same number of arms 114 as the anchor plate 90 and is oriented such that the arms 114 are radially aligned with the anchor plate arms 94. Each arm 114 has an axial slot 115 formed in the end thereof which extends radially inward. A bore 116, shown in phantom in FIG. 7, passes through both sides of each slot 115 in a direction which is transverse to the axis 39.

The actuator arm slots 115 receive upper end portions 120 of a plurality of movable links 121. Each movable link upper end 121 includes an upper aperture 122 formed therethrough which is aligned with the corresponding actuator arm bore 116. A link pin 123 passes through each actuator arm bore 116 and the corresponding link upper aperture 122 to secure the movable link 121 within the actuator arm slot 115. The link upper apertures 122 are sized to allow free rotation of the links 121 about the link pins 123.

The movable links 121 also have a lower end portion 124, each of which has a lower aperture 125 formed therethrough. As illustrated in FIG. 5, each link lower end portion 124 extends into the slot 106 formed in the upper portion 101 of the corresponding yoke member 100. The lower end portion 124 is positioned in the slot 106 such that the lower aperture 125 is aligned with the connecting bore 108 formed through the yoke member arms 107. A connecting pin 126 passes through the connecting bore 108 and the link lower aperture 125 to movably connect each link 121 to the corresponding yoke member 100. The sizing of the link lower aperture 125 is such that the link 121 is free to rotate about the connecting pin 126.

The actuator plate counterbore 113 receives a flange 128 attached to the end of a solid connector rod 129, the end of which is shown in FIG. 5. The coupler rod 129 is axially movable independently of the mold top segment 65 by a mechanism (not shown). A vent tube 130 extends in the downward direction in FIG. 5 through the actuator plate bore 112, the anchor plate aperture 92 and into the spacer plate bore 63. The lower end of the vent tube 130 is slidably received in the hub riser core vent 37A. A plurality of axial vent slots 131 are formed in the lower end of the vent tube 130.

The flange 128 is retained in the counterbore 113 by a U-shaped sliding plate 132, shown partially in phantom in FIG. 7, and a sliding plate guide 133 which are mounted upon the top of the actuator plate 110. The sliding plate 132 is movable between engaged and disengaged positions with a handle 134 which is attached to the top thereof. The sliding plate guide 133 includes an axial bore 135 formed therethrough of sufficient diameter to allow passage of the flange 128. However, when the sliding plate 132 is moved fully to the left, as shown in FIGS. 5 and 7, the plate 132 is in the engaged position and covers a portion of the top surface of the flange 128. This locks the flange 128 in the counterbore 113, causing the actuator plate 110 to move with the coupler rod 129. Thus, when the locking plate 132 is in the engaged position, axial movement of the coupler rod 129 moves the actuator plate 110 towards or away from the anchor plate 90. A removable pin 136 locks the sliding plate 132 in the engaged position. When the sliding plate 132 is moved fully to the right in FIGS. 5 and 7, the plate 132 is in the disengaged position and upward axial movement of the coupler rod 129 will withdraw the flange 128 from the counter bore 113.

To cast an improved wheel 50 with lightener pockets 51, the mold 60 is assembled as shown in FIG. 5 with the actuator plate 110 fully lowered and the pocket cores 75 fully extended. Molten metal is then fed into the mold cavity 40 through a sprue (not shown) by a conventional method such as gravity feed or pressure injection to form a wheel casting (not shown). Gases escape from the center of the mold cavity through the vent slots 131. After the metal has cooled, the sliding core assemblies 70 must be moved to the retracted position to allow withdrawal of the top segment 65 from the inside of the wheel casting. To retract the sliding core assemblies 70, the coupler rod 129 is moved axially upward in FIG. 5 while the mold top segment 65 remains stationary. The movement of the coupler rod 129 moves the actuator plate 110 axially away from the anchor plate 90. As the actuator plate 110 moves axially away from the anchor plate 90, the movable links 121 pull the yoke member upper portions 101 in an upward direction in FIG. 5, causing the yoke members 100 to pivot in a clockwise direction about the pivot pins 105. As the yoke members 100 pivot, each of the roll pins 109 cooperates with the corresponding roll pin cavity 72 formed in the core carriers 71 to urge the pocket core assemblies 70 inwardly along the guide slots 64 toward the center of the spacer and guide plate 62. The coupler rod 129 is raised until the pocket core tips 76 are fully retracted into the top segment openings 65A, as illustrated in FIG. 8. (For clarity, only one core carrier 71 and yoke member 100 are shown in FIG. 8.) Additionally, as the coupler rod 129 moves upward, the vent tube 130 is withdrawn from the hub riser core vent 37A, cleaning excess casting metal from the vent slots 131. Once the sliding core assemblies 70 are fully retraced, both the coupler rod 129 and the top segment 65 are moved axially upward in FIG. 8 and withdrawn from the casting. Then the side segments 32 and 33 are retracted, allowing removal of the wheel casting.

After removing the wheel casting, the side segments 32 and 33 are reclosed and the top segment 65 is reinserted therebetween. Once the top segment 65 is in position, the coupler rod 129 is moved axially downward in FIG. 8, causing the actuator plate 110 to move axially towards the anchor plate 90. As the actuator plate 110 moves towards the anchor plate 90, the movable links 121 push the yoke member upper portions 101 in an downward direction in FIG. 8, causing the the yoke members 100 to pivot in a counter-clockwise direction about the pivot pins 105. As the yoke members 100 pivot, each of the roll pins 109 cooperates with the corresponding roll pin cavity 72 formed in the core carriers 71 to urge the pocket core assemblies 70 outwardly along the guide slots 64. The coupler rod 129 is lowered until the pocket core tips 76 are fully extended from the top segment openings 65A, as shown in FIG. 5. Additionally, as the coupler rod 129 is lowered, the lower end of the vent tube 130 is reinserted into the hub riser core vent 37A. The mold 60 is then ready for casting another wheel 50.

A wheel mold 200 including an alternate embodiment of an apparatus 201 in accordance with the present invention is illustrated in FIGS. 9 through 12. Components shown in FIGS. 9 through 12 which are similar to components of the first apparatus 61 and the prior art mold 30 described above are indicated with the same numerical identifiers.

Figure 9:
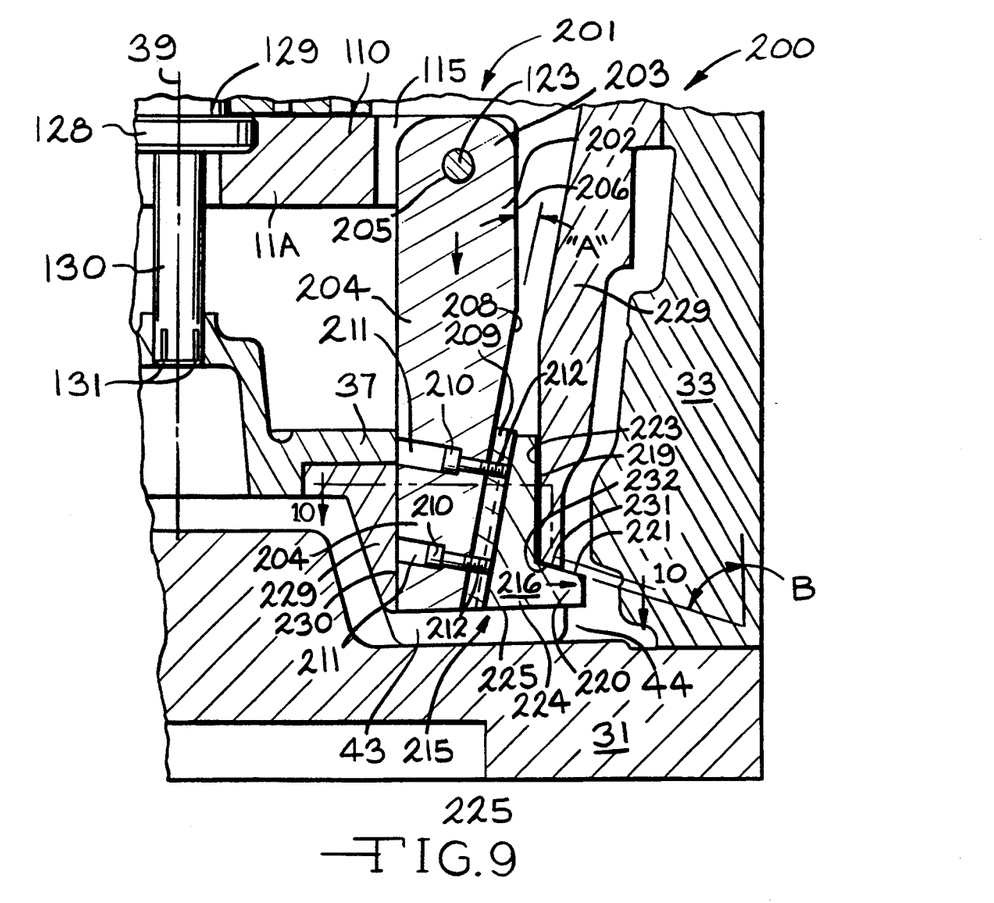
FIG. 9 is a fragmentary sectional view of a wheel mold which includes an alternate embodiment of an apparatus for forming lightener pockets.

The apparatus 201 includes the previously described actuator plate 110 which is movable axially towards and away from the top segment base by the coupler rod 129. The actuator plate 110 carries a plurality of wedge shaped plates 202, one of which is shown in FIG. 9. Each plate 202 includes an upper portion 203 which is disposed within one of the actuator arm slots 115 and a lower portion 204 which extends below the actuator plate 110 in FIG. 9. The upper portion 203 has an aperture 205 formed therethrough which is transverse to the central axis 39. The link pins 123 pass through the apertures 205 to secure the plates 202 within the slots 115. The apertures 205 are sized such that the plates 202 can rotate about the link pins 123.

The actuator plate slots 115 radially orient each plate 202 within the top segment 35. Accordingly, each plate 202 includes a radial outer surface 206. The lower portion of the outer surface 206 is formed at an angle "A" from the central axis 39 to define an inclined surface 208. A removable T-shaped guideway 209 is attached to each of the inclined surfaces 208 by a pair of threaded fasteners 210. The fasteners 208 pass through stepped bores 211 formed thru the plates 202 and are received by threaded bores 212 formed in the guideways 209. This allows replacement of the guideways 209 as they become worn.

Figure 11:
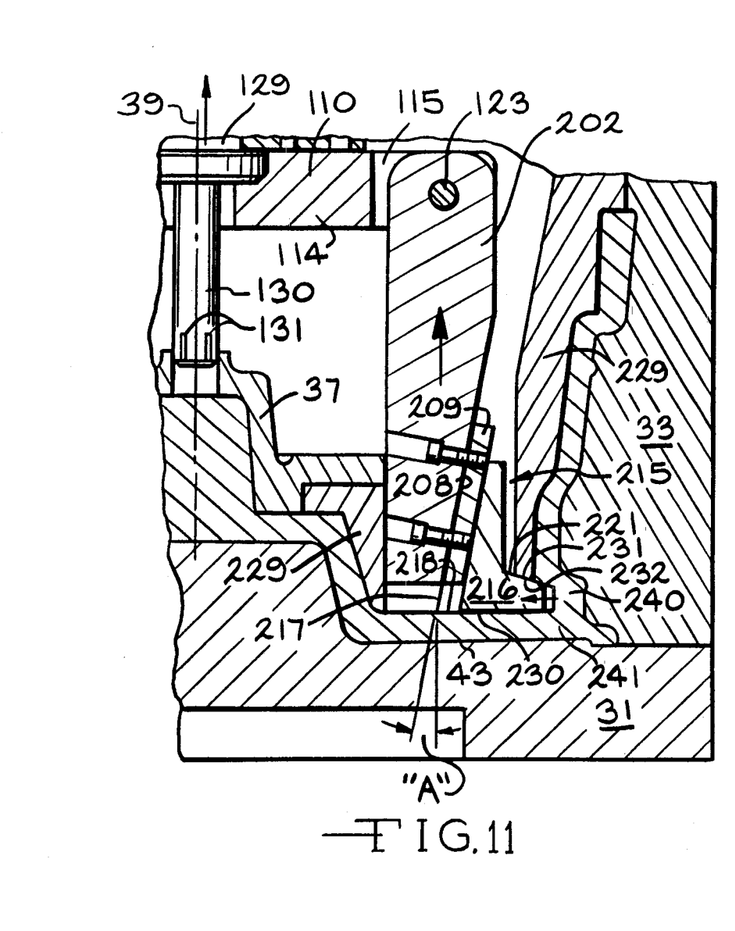
FIG. 11 is a fragmentary sectional view of the wheel mold shown in FIG. 9 with the apparatus partially withdrawn.
Figure 12:
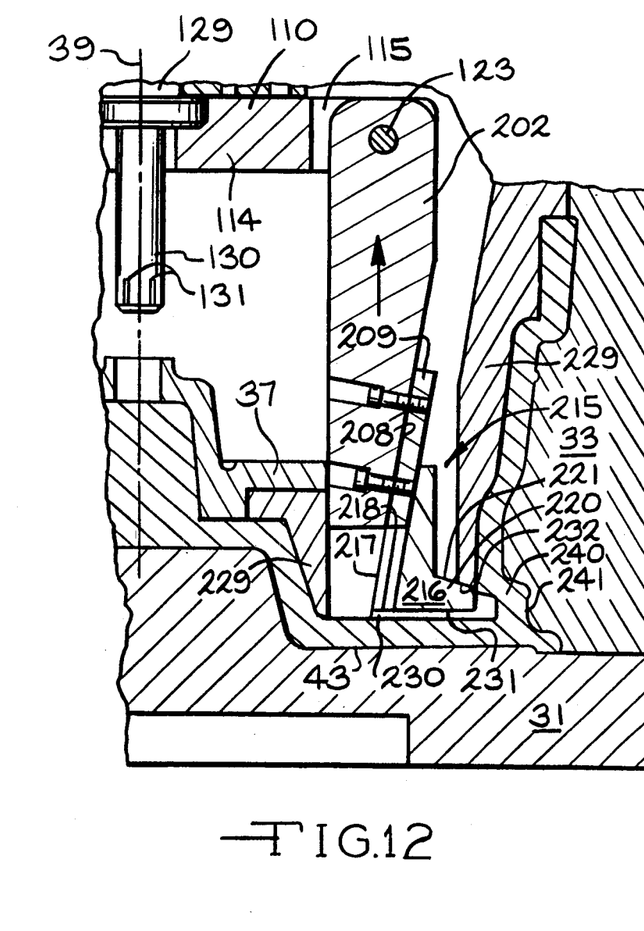
FIG. 12 is a fragmentary sectional view of the wheel mold shown in FIG. 9 with the apparatus fully withdrawn.

The apparatus 201 also includes a plurality of retractable cores 215 formed from a material that is not affected by high temperatures. The particular core material is selected for the specific application and can include various alloys of steel, titanium and ceramics. The retractable cores 215 have generally trapezoidal-shaped bodies 216. Each core body 216 has a radial inner surface 217 which is inclined at the same angle "A" from the central axis as the plate inclined surface 208, as shown in FIGS. 11 and 12. A T-shaped groove 218 is formed in the core body 216 along the length of the core inclined surface 217. Each core body 216 also has an outer surface 219 that is parallel to the inner surface of the top segment 34. A tapered core tip 220 extends radially outward from the lower portion of the core body 216. The top of the tip 220 defines an inclined surface 221 formed at an angle "B" from the central axis 39.

Figure 10:
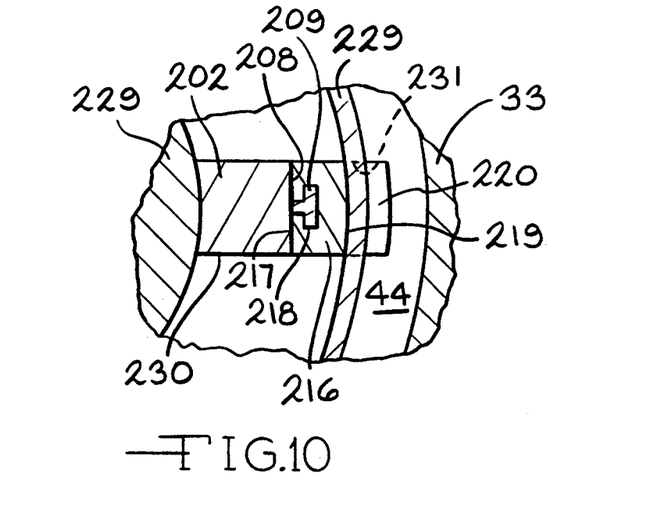
FIG. 10 is a fragmentary sectional view taken along line 10—10 in FIG. 9.

Each plate guideway 209 is slidably received in one of the core grooves 218, as illustrated in FIG. 10. Accordingly, the core inclined surfaces 217 can slide along the plate inclined surfaces 208. Thus, when the plates 202 move axially upward in FIG. 9, the cores 215 can slide axially downward and radially inward along the plate inclined surfaces 208. Similarly, when the plates 202 move axially downward in FIG. 9, the cores 215 can slide axially upward and radially outward along the plate inclined surfaces 208. A means (not shown) for limiting the extent of core travel along the plate inclined surfaces 208 is included in the apparatus 201.

As been seen in FIGS. 11 and 12, the wheel mold 200 includes a top segment 229 having a plurality of radial slots 230 formed therethrough which extend along the top of the wheel spoke cavities 43. The slots 230 include an end portion 231 that extends axially upward into the side of the top segment 229. The slot end portion 231 terminates in an inclined surface 232 formed at the angle "B" with the central axis 39. The actuator plate 100 is oriented such that the plates 202 are aligned with the top segment slots 230. When the actuator plate 110 is fully lowered, as shown in FIG. 9, the bottom ends of the plates 202, guideways 209, and retractable cores 215 extend into the top segment slots 230, forming the upper surface of the adjacent wheel spoke cavity 43. Similarly, the core tips 220 extend through the slot end portions 231 and into the sidewall cavity 44.

The operation of the alternate apparatus 201 will now be described. The mold 200 is assembled as shown in FIG. 9 with the actuator plate 110 fully lowered and the retractable tips 220 fully extended. Molten metal is then fed into the mold cavity 40 through a sprue (not shown) by a conventional method such as gravity feed or pressure injection. After the metal has cooled, the retractable tips 220 must be withdrawn from the casting's lightener pockets to allow retraction of the top segment 229 from the wheel casting.

To withdraw the tips 220, the coupler rod 129 is moved axially upwardly in FIG. 9, while the mold top segment 229 remains stationary. The movement of the coupler rod 129 moves the actuator plate 110 axially away from the base of the top segment 229, thereby raising the plates 202. As the plates 202 are raised, the core tips 220 are prevented from raising due to the core slot surface 232 and the wheel casting. Therefore, the cores 215 are forced to slide axially downward and radially inward along the guideways 209. As the cores 215 slide along the guideways 209, the plate inclined surfaces 208 exert an inwardly directed radial force upon the cores 215, pulling the cores 215 inwardly into the top segment 229. Additionally, as the cores 210 are raised, the inclined surfaces of the tips 221 co-operate with the inclined surfaces 232 of the end portions of the top segment slots 231 to urge the cores 210 radially inward. The combined forces exerted upon the retractable cores 215 are sufficient to break the cores 215 free from the wheel casting.

Referring now to FIG. 11, the retractable core 215 is shown in a partially retracted position. A casting 240 is shown in the mold to better illustrate the retraction of the core 215. Small directional arrows indicate the movement of the plates 202 and the cores 215 as the anchor plate 110 is raised. As the core tips 220 are retracted, lightener pockets 241 remain in the inside surface of the casting sidewall. The coupler rod 129 continues to be raised until the core tips 220 reach their fully retracted position, as illustrated in FIG. 12. Once the core tips 220 are fully retraced, both the coupler rod 129 and the top segment 229 are moved axially upward in FIG. 12 and withdrawn from the casting. Then the side segments 32 and 33 are retracted, allowing removal of the wheel casting 240 from the mold 200.

After removing the wheel casting, the side segments 32 and 33 are reclosed and the top segment 65 is reinserted therebetween. Once the top segment 65 is in position, the coupler rod 129 is moved axially downward in FIG. 12, causing the actuator plate 110 to move towards the base of the top segment 229. As the actuator plate 110 moves towards the top segment base, the plates 202 also more in a downward direction, as indicated by the small directional arrow in FIG. 9. As the plates 202 move downward, the plate inclined surfaces 208 cooperate with the inclined surfaces 217 of the core bodies 216 to exert an outward radial force upon the retractable cores 215. The inclined surfaces 232 of the end portions 231 of the top segment slots 230 co-operate with the inclined surfaces 221 of the core tips 220 to guide the tips 220 thru the slot end portions 231 and into the sidewall cavity 44, as indicated by the small directional arrow.

As the plates 202 continue to move downward, the bottom ends of the plates 202, guideways 209, and the cores 215 are reinstated into the top segment slots 230. The cores 215 continue to be urged outwardly by the plates 202 until the core outer surfaces 206 contact the inside surface of the top segment 34, at which point the core tips 220 are fully extended into the sidewall cavities 44. When the core tips 220 are fully extended, the bottom ends of the plates 202, guideways 209, and the cores 215 also are fully reinserted into the top segment slots 230 to form the upper surfaces of the spoke cavities 43. The mold 200 is then ready for casting another wheel 50.

Figure 13:
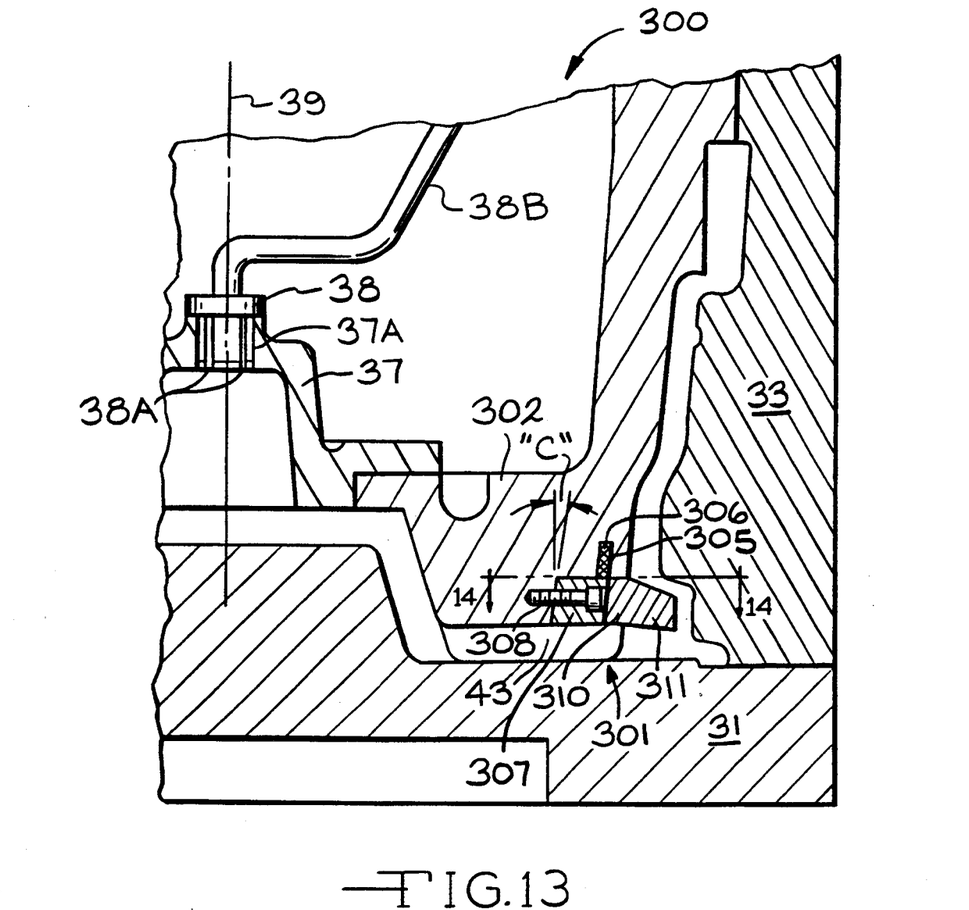
FIG. 13 is a fragmentary sectional view of a wheel mold which includes another embodiment of an apparatus for forming lightener pockets.
Figure 14:
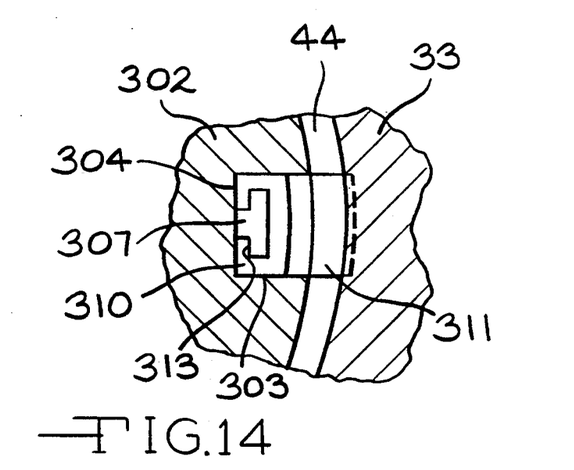
FIG. 14 is a fragmentary sectional view taken along line 14—14 in FIG. 13.
Figure 15:
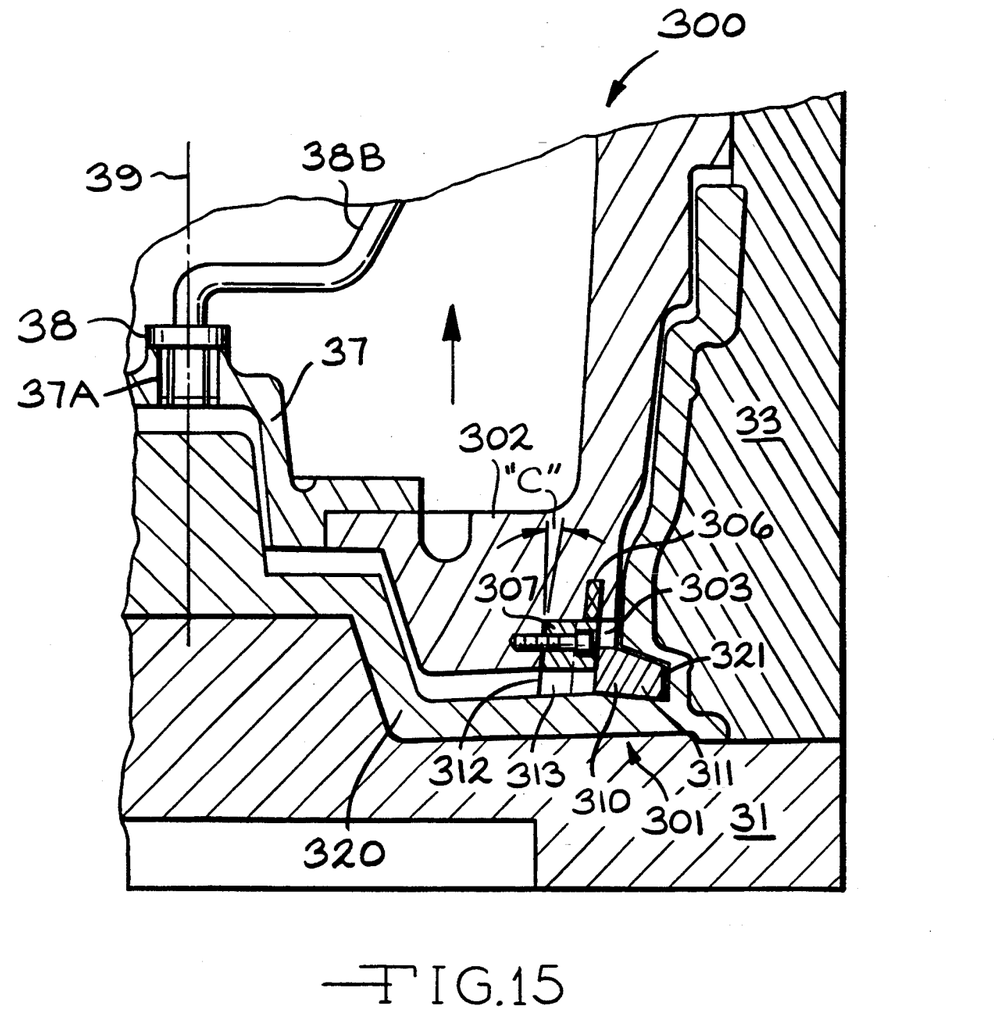
FIG. 15 is a fragmentary sectional view of the wheel mold shown in FIG. 13 with the apparatus partially withdrawn.

A wheel mold 300 including another alternate embodiment of an apparatus 301 in accordance with the present invention is illustrated in FIGS. 13 through 15. Components shown in FIGS. 13 through 15 which are similar to components of the prior art mold 30 described above are indicated with the same numerical identifiers.

The mold 300 includes a top segment 302 which has a plurality of radial slots 303 formed in the circumference of its bottom surface. The slots 303 are radially aligned with the spoke cavities 43. Each slot 303 includes a radial inner surface 304 inclined at an angle "C" with the axis 39. A bore 305 extends upward into the top segment 302 from each slot 303. A permanent magnet 306 is disposed within the bore 305 and retained therein. An inclined T-shaped guideway 307 is secured to the inner surface 304 of each slot 303 with a threaded fastener 308.

A retractable core 310 formed from a material that is not affected by high temperatures is received by each top segment slot 303. The particular core material is selected for the specific application and can include various alloys of steel, titanium and ceramics. The cores 310 include a tapered tip 311 and are retained in the slots 303 by the attraction of the permanent magnets 306. The core tips 311 extend into the sidewall cavity 44, as shown in FIG. 13. Each core 310 includes a radial inner surface 312 which is inclined at the same angle "C" as the inner surface 304 of the top segment base slots 303. A T-shaped axial groove 313 is formed in each core inner surface 312, as shown in FIG. 14. Each groove 313 slidingly receives the guideway 307 attached to the corresponding slot 303. Thus, the cores 310 are fee to slide along the guideways 307.

To use the mold 300, the cores 310 are inserted into the slots 303 with the grooves 313 receiving the guideways 307. As mentioned above, the cores 310 are retained in the slots 303 by the magnets 306. With the side segments 32 and 33 retracted, the top segment 302 is axially lowered into position above the bottom segment 31. Then the side segments 32 and 33 are closed over the top segment 302 to form the complete mold 300. Molten metal is then fed into the mold cavity 40 through a sprue (not shown) by a conventional method such as gravity feed or pressure injection.

After the metal has cooled, the vent plug 38 is removed from the hub riser core vent 37A. Then the top segment 302 is axially raised from the mold 300, as illustrated in FIG. 15 where the direction of movement is indicated by the small arrow. In FIG. 15, a wheel casting 320 is shown in the mold 300 to better illustrate the retraction of the core 310. As the top segment 302 is raised from the mold 300, the retractable cores 310 are retained within lightener pockets 321 formed in the casting 320, breaking the cores 310 free from the attraction of the magnets 306 and thereby detaching the cores 310 from the top segment 302. The retractable cores 310 slide downward along the guideways 307, allowing complete withdrawal of the top segment 302 from the wheel casting 320.

Additionally, as the top segment 302 is raised, the inclined guideways 307 act as wedges to exert a radially inwardly directed force upon each core 310. This force is sufficient to break the core tips 311 free from the lightener pockets 321, thereby releasing the cores 310 from the casting 320. Thus, while the cores 310 remain in the casting 320, they are freed therefrom and can be easily removed manually or by machine and reinstalled in the top segment slots 303 for casting another wheel 50.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. An apparatus for forming a cast wheel having at least one lightener pocket, the apparatus comprising;
    a wheel mold including a mold bottom segment at least two mold side segments supported by said bottom segment and a mold top segment defining a central axis, said mold top segment axially movable between raised and lowered positions, said top segment disposed between said side segments and defining a mold cavity with said side segments and said bottom segment when in said lowered position and said top segment axially displaced from said side segments and said bottom segment when in said raised position;

an actuator coupled to said top mold segment, said actuator movable along said central axis from a first axial position wherein said mold top segment is in said lowered position to a second axial position wherein said mold top segment is in said raised position, said actuator passing through an intermediate axial position when moved from said first axial position to said second axial position;

a movable lightener pocket core having a core tip, said pocket core mounted upon said wheel mold, extending in a radial direction from said central axis, and movable in said radial direction between an extended radial position and a retracted radial position, said core tip extending into said mold cavity when said pocket core is in said extended radial position; and means for coupling said pocket core to said actuator, said coupling means causing said pocket core to be in said extended radial position when said actuator is in said first axial position, said coupling means operable to move said pocket core in said radial direction from said extended radial position to said retracted radial position when said actuator moves from said first axial position to said intermediate axial position.

2. An apparatus, as defined in claim 1, wherein said coupling means is further operable to allow said actuator to move from said intermediate axial position to said second axial position without causing additional radial movement of said pocket core.

3. An apparatus, as defined in claim 2, wherein said pocket core has a roll pin cavity formed therein and further wherein said coupling means includes a roll pin, said roll pin being slidably received by said roll pin cavity, said roll pin rotating within said roll pin cavity when said actuator moves from said first axial position to said intermediate axial position, and said roll pin sliding within said roll pin cavity when said actuator moves from said intermediate axial position to said second axial position.

4. An apparatus, as defined in claim 1, wherein said wheel mold has a vent opening formed therethrough and further wherein said actuator means includes a vent tube having at least one vent opening formed therein, said vent tube movable with said actuator, said vent tube being received by said vent opening when said actuator is in said first axial position and said vent tube being withdrawn from said vent opening when said actuator is in said second axial position.

5. An apparatus, as defined in claim 1, wherein said wheel mold has an opening formed therethrough adjacent to said mold cavity, said opening receiving said pocket core, and further wherein said pocket core has a slot formed therein and said coupling means includes a guide member having an inclined portion, said inclined portion extending into said pocket core slot, said inclined portion slidable within said pocket core slot upon movement of said actuator from said first axial position to said intermediate axial position to urge said pocket core towards said retracted radial position.

6. An apparatus, as defined in claim 5, wherein said inclined portion has a T-shaped cross-section and said pocket core slot has a corresponding T-shape which receives said inclined portion.

7. An apparatus, as defined in claim 1, wherein said wheel mold has a slot formed in a surface of said mold cavity, said mold slot receiving a portion of said pocket core, and further wherein said pocket core has a slot formed therein and said coupling means includes an inclined guide member mounted in said mold slot, said guide member extending into said pocket core slot, said guide member slidable within said pocket core slot upon movement of said actuator from said first axial position to said intermediate axial position to urge said pocket core towards said retracted radial position.

8. An apparatus, as defined in claim 7, wherein said guide member has a T-shaped cross-section and said pocket core slot has a corresponding T-shape which receives said guide member.

9. An apparatus, as defined in claim 2, wherein said mold top segment has an opening formed therethrough adjacent to said mold cavity, said opening extending in a radial direction from said central axis, said opening slidably receiving said pocket core, and further wherein said pocket core has a roll pin cavity formed therein and said means for coupling said pocket core to said actuator includes a roll pin, said roll pin slidably received in said roll pin cavity, said roll pin operable to rotate within said roll pin cavity when said actuator moves from said first axial position to said intermediate axial position to move said pocket core from said extended radial position to said retracted radial position.

10. An apparatus, as defined in claim 9, wherein said means for coupling said pocket core to said actuator also includes a pivotable yoke member having said roll pin formed thereon, said yoke member being mounted upon an anchor plate which is attached to said wheel mold, said means for coupling said pocket core to said actuator further including an actuator plate which is coupled to said actuator and is axially movable along said central axis between said first and intermediate axial positions, said actuator plate coupled to said yoke member and operable to pivot said yoke member upon moving between said first and intermediate axial positions, causing said roll pin to rotate within said roll pin cavity.

11. An apparatus, as defined in claim 10, wherein said means for coupling said pocket core to said actuator further includes a connecting link coupling said actuator plate to said yoke member.

12. A method for forming a cast vehicle wheel having at least one lightener pocket formed therein, the method comprising the steps of:

(a) providing a wheel casting apparatus which includes a wheel mold having a mold bottom segment, at least two mold side segments supported by said bottom segment and a mold top segment defining a central axis, the mold top segment axially movable between raised and lowered positions, the top segment disposed between the side segments and defining a mold cavity with the side segments and the bottom segment when in the lowered position and the top segment axially displaced from the side segments and the bottom segment when in the raised position, the apparatus also including an actuator coupled to the top mold segment, the actuator movable along the central axis from a first axial position wherein the mold top segment is in the lowered position to a second axial position wherein the mold top segment is in the raised position, the actuator passing through an intermediate axial portion when moved from the first axial position to the second axial position, the apparatus further including a movable lightener pocket core having a core tip, the pocket core mounted upon the wheel mold and extending in a radial direction from the central axis, the pocket core movable in the radial direction between an extended radial position and a retracted radial position with the core tip extending into the mold cavity when the pocket core is in the extended radial position, and means for coupling the pocket core to the actuator, the coupling means causing the pocket core to be in the extended radial position when the actuator is in the first axial position, the coupling means operable to move the pocket core in the radial direction from the extended radial position to the retracted radial position as the actuator moves from the first axial position to the intermediate axial position;

(b) filling the mold cavity with a molten metal to form a wheel casting;

(c) allowing the mold and casting to cool sufficiently to allow removal of the wheel casting from the wheel mold;

(d) causing the actuator to move from the first axial position to the intermediate axial position to move the pocket core to the retracted radial position; and (e) removing the wheel casting from the wheel mold.

13. A method, as defined in claim 12, wherein the coupling means in step (a) is further operable to allow the actuator to move from the intermediate axial position to the second axial position without causing additional radial movement of the pocket core and further wherein step (d) includes continuing the axial movement of the actuator from the intermediate axial position to the second axial position after the pocket core has reached the retracted position.

* * * * *